United States Patent [19]

Maurer

[11] 4,049,198
[45] Sept. 20, 1977

[54] DUCT PRESSURE ACTUATED NOZZLE
[75] Inventor: John H. Maurer, Santa Clara, Calif.
[73] Assignee: The United States of America as represented by the Secretary of the Air Force, Washington, D.C.
[21] Appl. No.: 696,963
[22] Filed: June 17, 1976
[51] Int. Cl.² ............................................. B64C 15/06
[52] U.S. Cl. .................................. 239/265.39; 60/230
[58] Field of Search .................. 239/265.19, 265.33, 239/265.37, 265.39; 60/230, 231

[56] References Cited

U.S. PATENT DOCUMENTS

| 3,046,730 | 7/1962 | Petren | 239/265.39 |
| 3,897,907 | 8/1975 | Colley | 239/265.39 |

*Primary Examiner*—Evon C. Blunk
*Assistant Examiner*—Michael Mar
*Attorney, Agent, or Firm*—Joseph E. Rusz; Arsen Tashjian

[57] ABSTRACT

A variable area nozzle which utilizes high pressure duct nozzle air directly to actuate a variable area nozzle and thereby control the nozzle throat area. A servo controlled air valve directs the duct air pressure into a pressure cavity causing the nozzle to move toward the closed position while the nozzle entrance pressure acting on the converging flaps urges the nozzle to move toward the open position while the pressure cavity is exhausted to ambient through the air valve. Thus, the need for mechanical and/or hydraulic drives with the associated cooling requirements to produce variations of the nozzle configuration are effectively eliminated.

4 Claims, 2 Drawing Figures

DUCT PRESSURE ACTUATED NOZZLE

STATEMENT OF GOVERNMENT INTEREST

The invention described herein may be manufactured and used by or for the Government for governmental purposes without the payment of any royalty thereon.

BACKGROUND OF THE INVENTION

This invention relates to a variable area exhaust nozzle for jet engine propelled aircraft and, more particularly, the invention is concerned with providing a variable area nozzle wherein the throat area configuration is controlled directly by high pressure duct nozzle air in accordance with engine requirements at various aircraft flight speeds.

It is well known that large nozzle variation is required in present generation high Mach jet engines for handling the expansion that occurs at supersonic velocities. Intensive studies have been made regarding the improvement of engine operating efficiency under dissimilar flight conditions. For example, for subsonic flight speeds an efficient type of jet exhaust nozzle is one having a convergent shape and at near sonic and supersonic flight speeds, it is more desireable to employ a nozzle having a convergent nozzle followed by a divergent portion. For the most efficient operation it is desirable that the ratio of the throat area (area of minimum flow) to the exit area at the downstream end of the divergent portion be variable. The reason for this is that as flight speeds increase, the ratio of the pressure upstream of the throat to the pressure downstream thereof increases and it is necessary to increase the ratio of the exit area to the throat area in order to obtain efficient expansion.

Various convergent-divergent nozzles have been proposed having movable members which can vary the effective areas of the convergent and divergent portions. An accuation system for these types of convergent-divergent nozzle requires great flexibility which, in turn, necessitates the installation of heavy and complicated cam roller and/or gear type linkage arrangements. These presently available variable nozzle systems extract a high cost in weight and complexity as well as being more difficult to maintain and more subject to failure. Since the linkage arrangements are in a high temperature environment, the components such as air motors, cable drives, ball screws, etc. require cooling in order to survive.

Therefore, an ideal actuation system for controlling the throat area of a variable area nozzle would be one where the need for mechanical and/or hydraulic drives could be eliminated particularly in the high temperature environment of the exhaust nozzle. Also, the nozzle should be capable of being varied to provide configurations suitable for a wide range of operating conditions. The hereinafter described duct pressure actuated nozzle includes features which overcome the aforementioned disadvantages while at the same time provide a highly efficient system which is reliable and easily maintained.

SUMMARY OF THE INVENTION

The present invention is concerned with providing a system whereby the high pressure duct nozzle air is used directly to actuate a variable area nozzle and to control the nozzle throat area by means of a servo controlled air valve. This eliminates the need for mechanical and/or hydraulic drives and is particularly applicable to high temperature environments where components such as air motors, cable drives, ball screws, etc. could not survive or would require cooling.

A pressure cavity is formed using conventional flaps and seals. The forward pressure flap is integral with the converging flap and both pivot about a common axis point. The aft flap is pivotably attached to the forward flap and acts as a follower link. The aft end of the aft or follower flap is supported by a ring which seals with the engine case. The pressure force acting on the pressure flaps causes a moment around the common point tending to close the converging flaps. A servo controlled air valve can vary the cavity pressure from maximum to ambient which is almost negligible compared to maximum. When the cavity is pressurized to maximum, this causes a moment due to the pressure flaps of 2 x (M) or a net moment equal to magnitude (M) to close the nozzle. Similarly, when the cavity is exhausted to ambient there is caused a moment equal to (M) to open the nozzle.

Accordingly, it is an object of the invention to provide a duct pressure accuated nozzle wherein high pressure duct nozzle air is used directly to actuate a variable area nozzle.

Another object of the invention is to provide a duct pressure actuated nozzle wherein a servo controlled air valve operates to control the nozzle throat area.

Still another object of the invention is to provide a variable area exhaust nozzle for a turbojet aircraft whereinthe use of heavy and complex actuating mechanism is eliminated by using the duct air itself to vary the nozzle configuration.

A further object of the invention is to provide a variable area nozzle actuation system which includes a cavity formed by pressure flaps and a seal to receive duct air and cause converging flaps integral therewith to close and thereby vary the nozzle configuration.

A still further object of the invention is to provide a variable area nozzle actuation system wherein a servo controlled air valve can cause the pressure cavity to be varied from maximum to ambient thereby changing the nozzle configuration from fully closed to fully open.

These and other objects, features and advantages will become more apparent after considering the following description taken in conjunction with the annexed drawings and appended claims.

DESCRIPTION OF A PREFERRED EMBODIMENT

Figure 1:
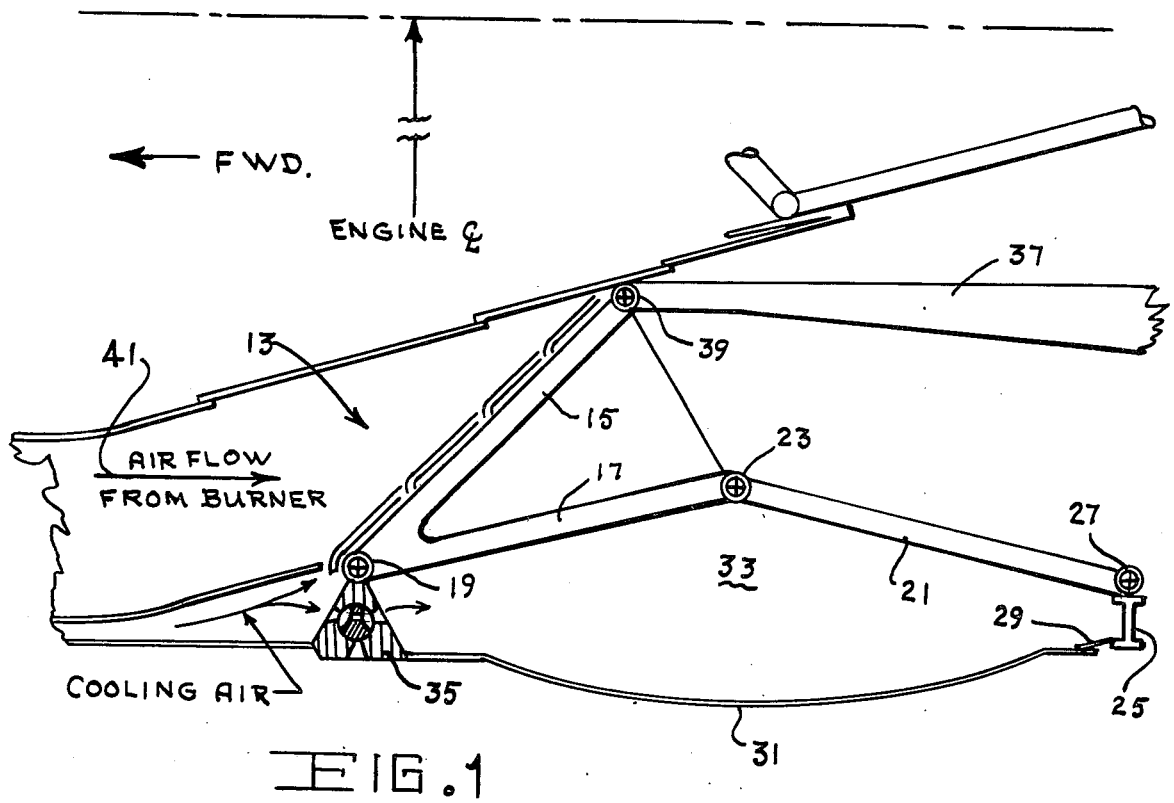
FIG. 1 is partial cross sectional view of a duct pressure actuated nozzle according to the invention showing the nozzle in the fully closed position with the pressure in the cavity at maximum.
Figure 2:
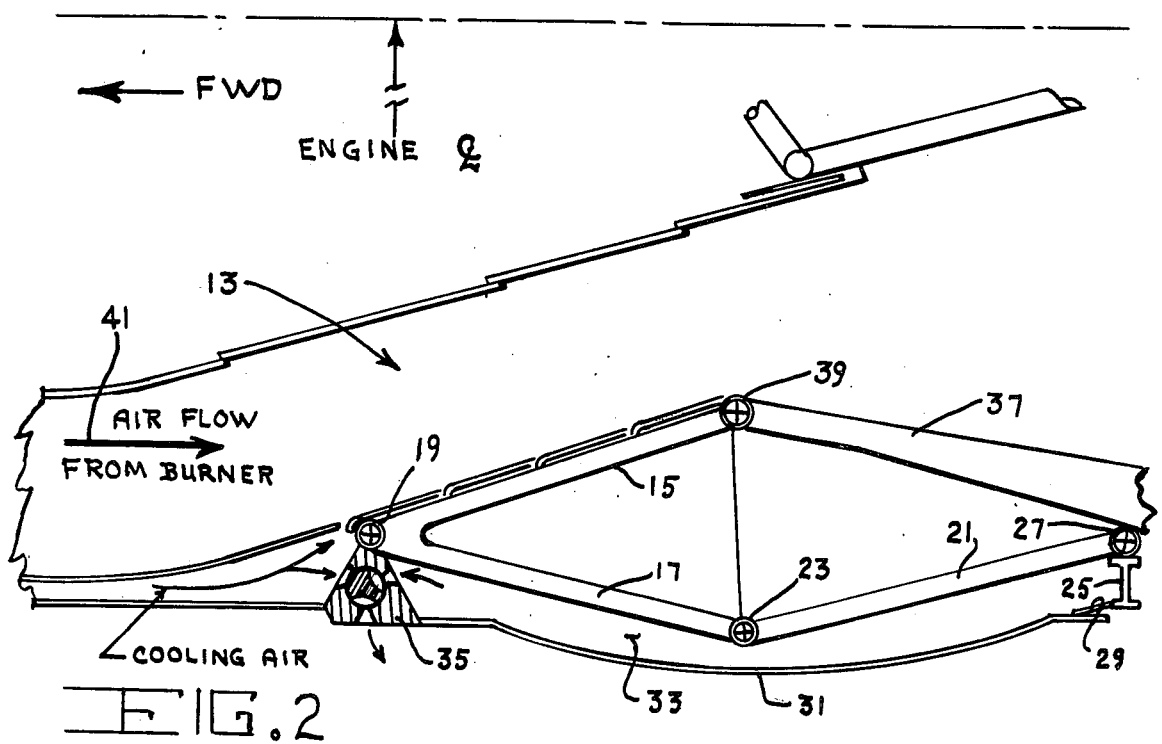
FIG. 2 is partial cross sectional view of the nozzle in the fully open mode with the pressure cavity at minimum and the servo controlled air valve open to ambient.

Referring now to the drawings, there is shown a variable area convergent-divergent nozzle 13 in two modes of operation, fully closed (FIG. 1) and fully open (FIG. 2). The nozzle 13 includes a converging flap 15 and a forward pressure flap 17 integral therewith adapted to pivot about the point 19. An aft flap 21 is pivotably attached to the aft end of the forward pressure flap 17 at the points 23 and acts as a follower link. The aft end of the aft or follower flap 21 is supported by the ring 25 and pivots about the point 27 affixed thereon. A seal 29 positioned between the ring 25 and the engine case 31 functions to prevent loss of pressure in the pressure cavity 33 formed by the engine case 31 and the forward and aft pressure flaps 17 and 21, respectively. A servo controlled air valve 35 operates to either direct the flow of cooling air into the pressure cavity 33 or allow the air in the pressure cavity 33 to escape into the atmosphere. A diverging flap 37 is pivotably attached to the aft end of the converging flap 15 and pivots about the point 39 during variation of the nozzle configuration.

In operation, the nozzle pressure created by the airflow from the engine burner and shown by the arrow 41 acts on the converging flap 15 to cause a moment about the point 19 of magnitude (M) urging the nozzle 13 to the open position. The surface area of the pressure flaps 17 and 21 is approximately twice that of the surface area of the converging flap 15. Thus the flaps 15, 17 and 21 would be pressure balanced with a pressure in the cavity 33 of approximately one-half the nozzle entrance pressure 41. The air valve 35 can be positioned to vary the pressure in the cavity 33 from maximum or nozzle entrance pressure 41 to ambient or atmospheric. When the cavity 33 is pressurized to maximum or nozzle entrance pressure 41, a moment due to the pressure flap 17 and 21 of 2 x (M) is created resulting in a net moment equal to magnitude (M) to close the nozzle 13. Similarly, when the cavity is exhausted to ambient, there is a moment equal to (M) to open the nozzle 13.

Thus, it can be seen that the use of the cooling air duct air pressure in conjunction with the air valve 35 can move the nozzle 13 in either direction. Since there are no mechanical components which would require cooling, the use of the hereinbefore described nozzle on high temperature high Mach number engines is highly advantageous.

Although the invention has been illustrated in the accompanying drawings and described in the foregoing specification in terms of a preferred embodiment thereof, the invention is not limited to this embodiment or to the particular configuration mentioned. It will be apparent to those skilled in the art that the hereinbefore described duct pressure actuated nozzle is of greatly simplified construction in comparison to known systems. At the same time, it is capable of controlling a nozzle configuration in a manner such as to permit the convergent-divergent flaps to be fully variable for more efficient engine operation over a wide range of flight conditions. Also, it should be noted that certain changes, modifications and substitutions can be made, particularly with respect to the construction details without departing from the true spirit and scope of the appended claims.

Having thus set forth the nature of my invention what I claim and desire to secure by Letters Patent of the United States is:

1. In a variable area convergent-divergent nozzle for use on an aircraft powered by a jet engine having an inner and an outer casing with a cooling air flow passage therebetween, the improvement comprising, a series of converging flaps pivotally mounted in the flow path of the engine exhaust, a corresponding series of forward pressure flaps integral with said coverging flaps, both of said series of flaps mounted for rotation about a common pivot point, an aft pressure flap pivotally mounted on the aft end of each of said forward pressure flaps and extending rearwardly therefrom, means for sealing the area outside said forward and aft pressure flaps to create a pressure cavity between the outer casing of the jet engine and the pressure flaps, the aft ends of said aft pressure flaps being pivotally attached to said sealing means, a diverging flap pivotally mounted on the aft end of each of said converging flaps, and means for controlling the flow of cooling air into and out of the pressure cavity to cause the pressure therein to be increased and decreased, respectively, causing said integral converging and pressure flaps to move inward and outward, respectively, in response to the requirement of the aircraft.

2. The improved variable area convergent-divergent nozzle defined in claim 1 wherein said sealing means includes a ring member positioned around the aft end of said aft pressure flap and a seal slidably disposed between said ring and the outer casing of the engine to effectively prevent the escape of pressurized air from the downstream end of the pressure cavity.

3. The improved variable are a convergent-divergent nozzle defined in claim 1 wherein the means for controlling the flow of cooling air into and out of the pressure cavity includes a servo controlled air valve positioned in the forward end thereof, said air valve allowing the cooling air to enter the pressure cavity when the nozzle is to be configurated in the closed mode and allowing the air to escape from the pressure cavity when the nozzle is to be configurated in the open mode.

4. The improved variable are a convergent-divergent nozzle defined in claim 3 wherein the main airflow from the jet engine burner operates to urge the convergent flaps to the open position when the pressure in the pressure cavity is lowered below a predetermined value.

* * * * *